United States Patent [19]
Staendeke

[11] 3,760,001
[45] Sept. 18, 1973

[54] PRODUCTION OF TRIALKYLPHOSPHINES
[75] Inventor: Horst Staendeke, Bruhl, Germany
[73] Assignee: Knapsack Aktiengesellschaft, Knapsack near Cologne, Germany
[22] Filed: Mar. 31, 1972
[21] Appl. No.: 239,922

[30] Foreign Application Priority Data
Apr. 3, 1971 Germany................... P 21 16 439.6

[52] U.S. Cl.......................................... 260/606.5 P
[51] Int. Cl. ............................................. C07f 9/50
[58] Field of Search............................. 260/605.5 P

[56] References Cited
UNITED STATES PATENTS
3,481,988   12/1969   Wunsch et al................ 260/606.5 P
343,255   3/1969   Maier........................... 260/606.5 F Primary Examiner—Werten F. W. Bellamy
Attorney—Arthur G. Connolly et al.

[57] ABSTRACT

Production of trialkyphosphines of the general formula $R_3P$, in which R stands for alkyl groups having from 1 to 3 carbon atoms. In a first step a vaporous or gaseous mixture of phosphorus and an alkyl halide is passed in the absence of oxygen or air and at a temperature between 280° and 420°C, over an active carbon catalyst, the resulting gaseous reaction mixture is subjected to fractional condensation so as to isolate monoalkyl-halogenophosphine, dialkylhalogenophosphine and a two layer-forming mixture of trialkylphosphonium halide and unreacted phosphorus therefrom, the trialkylphosphonium halide is decanted and, in a second step an aqueous alkali is added to the trialkylphosphonium halide so as to produce trialkylphosohine therefrom.

19 Claims, No Drawings

PRODUCTION OF TRIALKYLPHOSPHINES

The present invention relates to a process for the manufacture of trialkylphosphines of the general formula $R_3P$, in which R stands for alkyl groups having from 1 to 3 carbon atoms.

It has already been reported earlier that trialkylphosphines can be made by the Grignard reaction in accordance with the following equations:

$$PX_3 + 3\ RMgX \rightarrow R_3P + 3\ MgX$$
$$RPX_2 + 2\ RMgX \rightarrow R_3P + 2\ MgX_2$$
$$R_2PX + RMgX \rightarrow R_3P + MgX_2$$

or from phosphides of metals Me and alkyl halides in accordance with the following equations:

$$PMe_3 + 3\ RX \rightarrow R_3P + 3\ MeX$$
$$RPMe_2 + 2\ RX \rightarrow R_3P + 2\ MeX$$
$$R_2PMe + RX \rightarrow R_3P + MeX$$

and this with the possibility of replacing the Grignard compounds by further organometallic compounds, such as lithium alkyl, sodium alkyl, potassium alkyl, aluminium trialkyl and lead tetraalkyl.

A further process for making tertiary alkylphosphines has been described in Houben-Weyl, "Methoden der Organischen Chemie", volume XII/1 (1963), pages 25/26, wherein 1-olefins are reacted with hydrogen phosphide under pressure at about 100°C and with exposure to light, in the presence of agents yielding radicals, such as di-tert.-butyl-peroxide, for example. This reaction effects the additive combination of the phosphorus atom with the terminal double bond of the olefin. The reaction of $PH_3$ with an excess of ethylene is found exclusively to produce primary ethylphosphine, whereas the reaction of $PH_3$ with stoichiometric proportions of the olefin results in the formation of mixtures comprising primary, secondary and tertiary alkylphosphines. The mixture obtained by the reaction of stoichiometric proportions of $PH_3$ and 1-butene contains 38 percent by volume of butylphosphine, 10 percent by volume of dibutylphosphine and 2 percent by volume of tributylphosphine.

These earlier processes are, however, not fully satisfactory because they either produce insufficient yields of desirable phosphine, or dictate the use of costly starting materials, which are required to be produced in a plurality of steps.

In German Patent No. 1,122,522, it has been reported that hydrocarbon-substituted halogenophosphines can be made by reacting red phosphorus with a hydrocarbon halide at a temperature between 200°C and the sublimation temperature of phosphorus, in the presence of powdered copper as a catalyst. The resulting gaseous monoalkyl- and dialkylhalogenophosphines are condensed and separated from each other by fractional distillation.

Still further, it has been reported in German published Specification DOS 1 568 928 that phosphorus in gas or vapor form can be reacted with an alkyl chloride at a temperature between 300° and 400°C, for example, in the presence of an active carbon catalyst with the resultant formation — this in a manner analogous to that described in German Patent 1 122 522 — of alkylchlorophosphines together with unreacted phosphorus.

These two latter processes teach that the reaction of elementary phosphorus with alkyl halides at elevated temperature in the presence of certain catalysts always results in the formation of alkylhalogenophosphines. We have now unexpectedly discovered, however, that by the use of elementary phosphorus and alkyl halides in the presence of an active carbon catalyst and by the use of certain reaction conditions, it is well possible to also produce trialkylphosphonium halides, which are easy to transform into trialkylphosphines.

The process of the present invention for the manufacture of trialkylphosphines of the general formula $R_3P$, in which R stands for alkyl groups having from 1 to 3 carbon atoms, comprises more particularly in a first step flowing a vaporous or gaseous mixture of phosphorus and an alkyl halide with between 1 and 3 carbon atoms in the alkyl radical by means of a carrier gas, in the absence of oxygen or air, and at a temperature between 280° and 420°C, over an active carbon catalyst, subjecting the resulting gaseous reaction mixture to fractional condensation so as to isolate monoalkylhalogenophosphine, dialkylhalogenophosphine and a two layer-forming mixture of trialkylphosphonium halide and unreacted phosphorus therefrom, separating the trialkylphosphonium halide and purifying it by heating to temperatures higher than the boiling point of the alkylhalogenophosphines, and in a second step dissolving or suspending the trialkylphosphonium halide in water, adding alkali to the resulting solution or suspension so as to establish a pH-value of at least 4 therein, and isolating trialkylphosphine which begins to separate from the aqueous phase, by distillation or phase separation.

A preferred feature of the process of the present invention comprises using as starting materials yellow phosphorus and alkyl halides having chlorine or bromine as the halogen atom therein, for example methyl chloride, methyl bromide or ethyl chloride. In order to enable the starting materials transformed into gas or vapor form to be passed at a satisfactory speed over the catalyst, it is good practice to use as the carrier gas a hydrogen halide, in which chlorine or bromine is the halogen, or hydrogen, nitrogen, argon, or a suitable mixture thereof.

The gaseous starting materials of alkyl halide and phosphorus in vapor form which are passed over the catalyst, should generally be used in a molar ratio between 0.5 and 3. The gas mixture including the carrier gas, which is passed over the catalyst, may contain up to 80 percent by volume, preferably between 30 and 50 percent by volume, of carrier gas. A gas mixture consisting approximately of 30 percent by volume of alkyl halide, approximately 20 percent by volume of phosphorus in vapor form and approximately 50 percent by volume of carrier gas is particularly useful for practical operation.

Use should be made of a reaction temperature between about 340° and 360°C so as to avoid partial decomposition of the resulting reaction product, and the reaction mixture should be contacted with the catalyst for a period between about 0.1 second and 30 minutes, preferably between about 10 seconds and 5 minutes, so as to ensure an optimum conversion rate for the starting materials in contact with the catalyst.

The gaseous reaction product which comprises several components is generally worked up by subjecting the individual components of the mixture to fractional condensation. Trialkylphosphonium halide, for example, is precipitated from the reaction mixture at a temperature between 60° and 150°C. The selective condensation of trialkylphosphonium halide is effected by cooling the mixture down to a temperature of approximately 100°C. In order to effect the condensation of the further components of the mixture, such as monoalkylhalogenophosphine, dialkylhalogenophosphine and unreacted alkyl halide, it is necessary to subject the residual gas, freed earlier from trialkylphosphonium halide, to stagewise condensation at a temperature lower than 60°C, the alkyl halide, which is recovered, being used again for reaction with phosphorus.

A still further preferred feature of the process of the present invention comprises improving the catalyst's efficiency by drying it at a temperature between about 350° and 360°C, preferably in the presence of a hydrogen halide, and this prior to using it. The use of a hydrogen halide as the carrier gas and the pretreatment of the catalyst therewith at elevated temperature has beneficial effects upon the yield of trialkylphosphonium halide. It is therefore justified to believe that the hydrogen halide carrier gas does not act as an inert gas, but does favorably influence the course of the reaction.

In order to obtain pure trialkylphosphine, the trialkylphosphonium halide is dissolved or suspended in water, the resulting solution or suspension is mixed with an alkali so as to establish a preferred pH-value between about 9 and 10 therein, and trialkylphospine which begins to precipitate from the aqueous phase is separated therefrom by distillation or phase separation. The useful alkaline addends include $NaOH$, $Ca(OH)_2$ or $Na_2CO_3$, for example.

The process of the present invention, which is the first to permit the manufacture of trialkylphosphine from elementary phosphorus and an alkyl halide via trialkylphosphonium halide, is a very desirable step forward in the art. The present process must be regarded as a commercially attractive procedure, especially in those cases in which inexpensive yellow phosphorus is substituted for more costly red phosphorus, despite the relatively limited yields of trialkylphosphine, which, however, is obtained together with mo-no- and dialkylhalogenophosphines, that are also valuable reaction products of commercial interest, for example, in the production of biocides. As compared with earlier methods, the present process is an uncomplicated procedure which can more particularly be carried out continuously.

Trialkylphosphines find widespread uses as catalysts, for example in the form of complex compounds with transition metal compounds in the cyclization of ethylene and acetylene compounds, in the polymerization of aldehydes, ethylene and acetylene derivatives, in the hydroformylation, and in the dehydrohalogenation of halogenated hydrocarbons.

EXAMPLE

Nitrogen was introduced into an experimental apparatus to expel air therefrom and produce trialkylphosphine therein. Following this, the 2 000 grams of active carbon placed in a tubular reactor were dried at a temperature between 350° and 360°C in the presence of hydrogenchloride. After the pretreatment of the catalyst was terminated, 120 liters/hr of hydrogen chloride gas were mixed with 70 liters/hr of methyl chloride in a mixer, and the resulting mixture was passed through the tubular reactor, which had a temperature of 360°C. 160 Grams/hr of yellow phosphorus coming from a reservoir were simultaneously introduced into the tubular reactor and evaporated therein. The resulting phosphorus vapors in admixture with the hydrogen chloride and methyl chloride were passed over the active carbon catalyst and underwent reaction. The resulting hot reaction gases were cooled in a steam-heated condenser and trimethylphosphonium chloride together with unreacted phosphorus were condensed therein. Fractions of the reaction gas which remained uncondensed in the condenser were delivered to three further condensers series-connected together, and subjected to stagewise cooling therein down to temperatures of 20°C, −40°C and −80°C, respectively, and the resulting condensates were collected in collectors, which were connected thereto. The experiment was arrested after 80 hours of operation. The products obtained were taken from the individual collectors and the yield was determined.

The first collector contained 1.2 kg of crude trimethylphosphonium chloride. The second and third collectors were found to have 9 kg of methyldichlorophosphine and 4.5 kg of dimethylchlorophosphine, respectively, therein. The last collector contained 2.6 kg of unreacted methyl chloride.

The crude trimethylphosphonium chloride was purified by heating it to a temperature of 150°C and about 300 grams of a mixture of methyldichlorophosphine and dimethylchlorophosphine were obtained as the distillate.

The distillation residue consisting of trimethylphosphonium chloride was mixed with approximately 1 liter of water and the resulting solution was heated to about 50°C. By the addition of a 35 weight percent sodium hydroxide solution, a pH-value between about 9 and 10 was established in the aqueous solution. Trimethylphosphine began to distil from the aqueous phase at a pH-value of approximately 4 and within a boiling range between 36° and 38°C. The issuing vapors were liquefied in a condenser. Trimethylphosphine was obtained in a quantity of 590 grams. This corresponded to a yield of 10 percent, based on the methyl chloride, which underwent reaction. The methylchlorophosphines obtained as further reaction products were obtained in a yield of 73 percent, equally based on the methyl chloride which underwent reaction.

I claim:

1. A process for the manufacture of trialkylphosphines of the general formula $R_3P$, in which R stands for alkyl groups having from 1 to 3 carbon atoms, comprising in a first step flowing a vaporous or gaseous mixture of phosphorus and an alkyl halide with between 1 and 3 carbon atoms in the alkyl radical by means of a carrier gas, in the absence of oxygen or air, and at a temperature between 280° and 420°C, over an active carbon catalyst, subjecting the resulting gaseous reaction mixture to fractional condensation so as to isolate monoalkylhalogenophosphine, dialkylhalogenophosphine and a two layer-forming mixture of trialkylphosphonium halide and unreacted phosphorus therefrom, decanting the trialkylphosphonium halide and purifying it by heating to temperatures higher than the boiling point of the alkylhalogenophosphines, and in a second step dissolving or suspending the trialkylphosphonium halide in water, adding an alkali to the resulting solution or suspension so as to establish a pH-value of at least 4 therein, and isolating the trialkylphosphine which begins to separate from the aqueous phase, by distillation or phase separation.

2. The process as claimed in claim 1, wherein yellow phosphorus is used.

3. The process as claimed in claim 1, wherein the halogen atom is chlorine or bromine.

4. The process as claimed in claim 1, wherein the alkyl halide is methyl chloride, methyl bromide or ethyl chloride.

5. The process as claimed in claim 1, wherein the carrier gas is a hydrogen halide, of which the halogen atom is chlorine or bromine, or hydrogen, nitrogen, argon or a suitable mixture thereof.

6. The process as claimed in claim 1, wherein the gaseous mixture of alkyl halide and phosphorus in vapor form passed over the catalyst contains the alkyl halide and the phosphorus in a molar ratio between 0.5 and 3.

7. The process as claimed in claim 1, wherein the gaseous or vaporous mixture of phosphorus, alkyl halide and carrier gas contains up to 80 percent by volume of carrier gas.

8. The process as claimed in claim 7, wherein the gaseous or vaporous mixture contains between 30 and 50 percent by volume of carrier gas.

9. The process as claimed in claim 7, wherein the gaseous mixture consists approximately of 30 percent by volume of alkyl halide, approximately 20 percent by volume of phosphorus in vapor form and approximately 50 percent by volume of carrier gas.

10. The process as claimed in claim 1, wherein the reaction temperature is between 340° and 360°C.

11. The process as claimed in claim 1, wherein the reaction mixture is contacted with the catalyst for a period between about 0.1 second and 30 minutes.

12. The process as claimed in claim 11, wherein the reaction mixture is contacted with the catalyst for a period between about 10 seconds and 5 minutes.

13. The process as claimed in claim 1, wherein the gaseous reaction mixture is subjected to condensation at a temperature between 60° and 150°C so as to isolate trialkylphosphonium halide therefrom.

14. The process as claimed in claim 13, wherein the trialkylphosphonium halide is condensed at about 100°C.

15. The process as claimed in claim 1, wherein the gaseous reaction mixture is subjected to stagewise condensation at a temperature lower than about 60°C so as to isolate therefrom monoalkylhalogenophosphine and dialkylhalogenophosphine formed together with the trialkylphosphonium halide, and unreacted alkyl halide, and the isolated alkyl halide is used again for reaction with phosphorus.

16. The process as claimed in claim 1, wherein the catalyst is dried at a temperature between about 350° and 360°C, prior to using it.

17. The process as claimed in claim 16, wherein the catalyst is dried at temperatures between about 350° and 360°C in the presence of hydrohalic acid, prior to using it.

18. The process as claimed in claim 1, wherein $NaOH$, $Ca(OH)_2$ or $Na_2CO_3$ is added to the aqueous solution or suspension so as to establish a pH-value of at least 4 therein.

19. The process as claimed in claim 1, wherein an alkali is added to the aqueous solution or suspension so as to establish a pH-value between 9 and 10 therein.

* * * * *